UNITED STATES PATENT OFFICE.

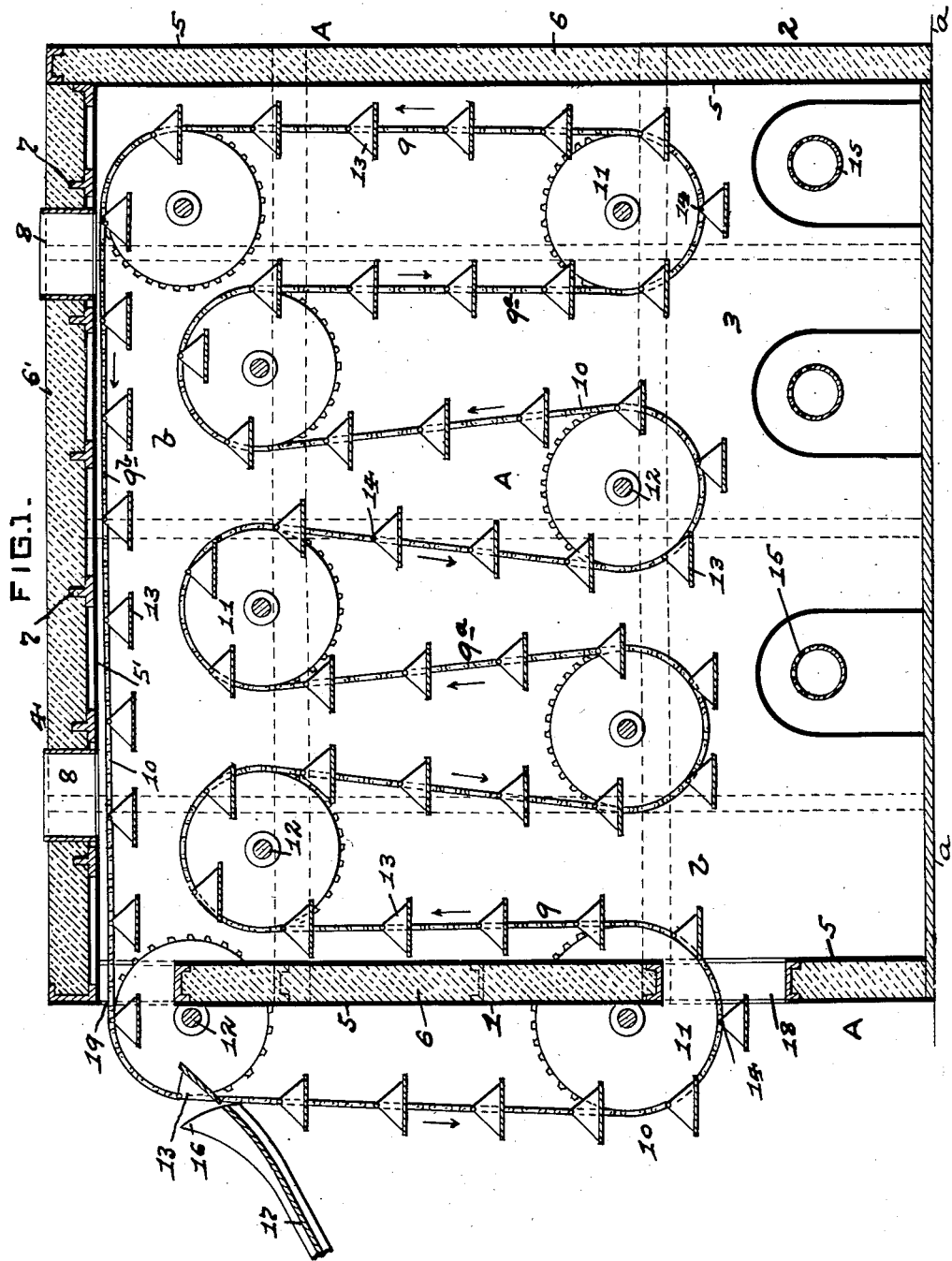

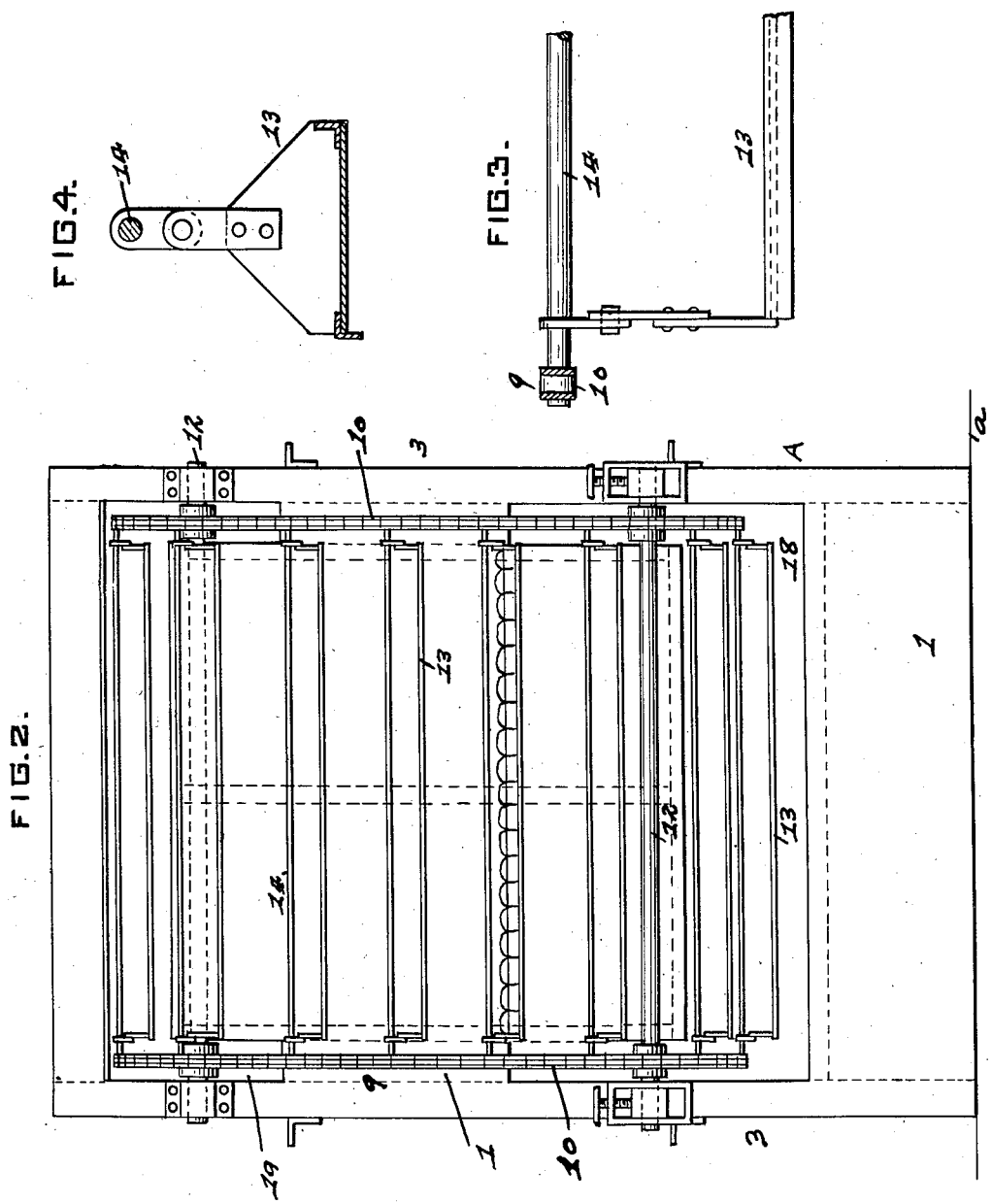

FREDERICK C. HALLER, OF WILKINSBURG, PENNSYLVANIA.

BAKING-OVEN.

1,359,247. Specification of Letters Patent. Patented Nov. 16, 1920.

Application filed August 4, 1919. Serial No. 315,151.

*To all whom it may concern:*

Be it known that I, FREDERICK C. HALLER, a citizen of the United States, and a resident of Wilkinsburg, in the county of Allegheny and State of Pennsylvania, have invented a new and useful Improvement in Baking-Ovens; and I do hereby declare the following to be a full, clear, and exact description thereof.

My invention relates to bakers' ovens, and has special reference to a method and apparatus for the baking of bread and other like articles.

The object of my invention is to provide a cheap, simple and efficient method and apparatus for the baking of bread, whereby such bread will be baked rapidly and conveniently, will provide for an apparatus that will occupy small space with greater capacity than the ordinary ovens, and will bake each loaf of bread uniformly.

To these ends my invention consists, generally stated, in the novel method and apparatus as hereinafter more specifically set forth and described and particularly pointed out in the claims.

To enable others skilled in the art to which my invention appertains to practice my method and construct and use my apparatus, I will describe the same more fully referring to the accompanying drawings, in which—

Figure 1 is a vertical section of my improved apparatus;

Fig. 2 is a cross-section of the same;

Fig. 3 is an enlarged detail section of the shelf or tray employed; and

Fig. 4 is a cross section of the same.

Like symbols of reference herein indicate like parts in each of the figures of the drawings.

As illustrated in the drawings A represents my improved oven, which is arranged to be set upon the floor $a$ of a bakery and is provided with the front wall 1, rear wall 2, side walls 3 and top wall 4 to form the baking chamber $b$ between the same. These walls are formed from metal sheets or plates which are connected together in any suitable manner, with such front wall 1, rear wall 2 and side walls 3 being composed of two spaced plates 5 having a lining of magnesia, asbestos or other suitable refractory material 6 between the same, and the top wall 4 being formed of a single plate 5' which is braced by the angle bars 7 across the same.

The top wall 4 is provided with magnesia, asbestos or other refractory material 6' over the same for forming a roof or covering for said wall and extending through such wall and covering 6' are the two exit flues 8 which lead from the baking chamber $b$ to any suitable chimney or stack.

Operating within the baking chamber $b$ and in the front of the same is the conveyer 9, which is formed of two continuous chains 10, each of which is adapted to pass over and be engaged by the interior and exterior sprocket wheels 11 mounted on each end of the cross-shafts 12. These shafts 12 are supported within and in front of the chamber $b$ in any suitable bearings (not shown) on the front wall 1 and side walls 3 and such chains 10 are operated in any suitable manner, such as by means of power applied to any one of said shafts.

The chains 10 are provided with a number of shelves or trays 13, which extend across between such chains, and are placed continuously around and spaced apart on said chains. These trays 13 are pivoted to rods 14 which extend between the chains 10 and thereby are arranged to always maintain a horizontal position wherein the chains are placed for operating, except when it is desired to tilt such trays, as hereinafter described.

The sprocket wheels 11 are so arranged that the chains 10 carrying the trays 13 for forming the conveyer 9 will travel over such wheels in a substantially up and down vertical movement, as shown by the portions $9^a$ on the conveyer within and in front of the chamber $a$, except that a portion of such conveyer will travel in a horizontal movement, as shown by the portion $9^b$ when such portion has traveled through the chamber $a$ and has left the upper rear wheels 11 to assume such position and then assume the front vertical portion $9^a$ in passing over the front wheels 11.

Within the lower part of the chamber $a$ are the burners 15 for supplying heat to the said chamber and to which any suitable fuel, such as gas, can be applied, and in front of the front exterior portion $9^a$ of the conveyer 10 is a stationary discharge nose 16 which is adapted to engage with each of the trays 13, as hereinafter described, and is provided with the chute 17.

An opening 18 is formed in the lower portion of the front wall 1 for the lower front wheel 11 and the chains 10 and trays 13 in passing through the same into the chamber $b$, and an opening 19 is formed in the upper portion of the said wall for the upper front wheel 11 and the said chains and trays in emerging from said chamber.

The use and operation of my method and apparatus for baking bread is as follows: The bread, or other articles to be baked, is placed upon each of the trays 13 as such trays pass down on the chains 10 in front of the oven A, such as indicated by the arrow, and after such trays have passed the discharge nose 16 and assumed their horizontal positions. As fast as the trays 13 are filled on the front exterior portion $9^a$ on the conveyer 9, as above described, such trays containing such bread pass through the opening 18 in the front wall 1 into the baking chamber $b$, and then they pass above the burners 15 with such chains 10 on the said conveyer and along through said chamber and over the wheels 11 therein in substantially an up and down vertical movement. During this movement of the bread filled trays 13 in the chamber $b$ the bread is being baked by the heat from the burners 15 and when the filled trays 13 have reached and passed around the lower rear wheel 11, such trays will then pass up and over the upper rear wheel 11, and then along the upper part of the baking chamber $b$ in substantially a horizontal line to and over the upper front wheel 11, thereby completing the baking operation of such bread. As the baked bread on the trays 13 pass over the upper front wheel 11, each of the same will engage with the nose 16 in front of such wheel and tilt such trays, which will allow the bread on such trays to be slid or dumped therefrom into the discharge chute 17 and pass down the same into any suitable receptacle (not shown) at the bottom of the same.

It will thus be seen that in the use of my improved method and apparatus for baking bread the bread will be enabled to be fed into the baking chamber and be discharged therefrom after baking at one and the same end, thereby saving time, fuel and labor and permitting a small and compact oven to be used with an equal or greater capacity, than where the ordinary oven or ovens which permit feeding at one end and discharging at the other end are used.

It will also be seen that by arranging the chains carrying the trays for the bread in an inclined position in the baking chamber, they will subserve space and will keep such chains taut, while the arrangement of having the chains assume a horizontal position at the top of the chamber will prevent the bread filled trays thereon from being exposed at a long interval to the heat of the fire from the burners in the chamber, after the bread has been substantially baked in passing through the chamber in the up and down movement of the chains carrying such trays, thereby enabling a lighter heat to be had on the bread when about to be discharged from the chamber at the end of the baking process.

It will further be seen that the bread will not be exposed to the more intense heat from the burners for a long period in passing around the lower part of the conveyer and thereby such bread will only get sufficient baking by being exposed at intervals to the intense heat from such burners.

It will be evident that my improved method and apparatus can be employed for the baking of articles other than bread, and that various changes may be made in the same without departing from the spirit of the invention or sacrificing any of its advantages.

What I claim as my invention and desire to secure by Letters Patent is:

1. An apparatus for baking bread comprising a baking oven, an endless conveyer in said oven arranged to pass upwardly and downwardly throughout the greater portion of the length of the oven and to return in the oven above said upwardly and downwardly extending portions, said conveyer emerging at one end of the oven near the top thereof and returning into the oven at the same end near the bottom, whereby a vertically extending section of the conveyer is provided without the oven, pivotally supported trays carried by the conveyer, means for supporting the conveyer, and means for heating the oven.

2. An apparatus for baking bread comprising a baking oven, an endless conveyer in said oven arranged to pass upwardly and downwardly throughout the greater portion of the length of the oven and to return in the oven above said upwardly and downwardly extending portions, said conveyer emerging at one end of the oven near the top thereof and returning into the oven at the same end near the bottom, whereby a vertically extending section of the conveyer is provided without the oven, pivotally supported trays carried by the conveyer, means for supporting the conveyer, means for heating the oven, and means for engaging said trays as they descend along the outside vertical section for tipping the trays to automatically discharge the bread therefrom.

3. An apparatus for baking bread comprising a baking chamber which is open at one end only, an endless conveyer passing up and down in the baking chamber and returning horizontally above the up and down portions and within the baking chamber, said carrier emerging from one end of the baking chamber near the top thereof and re-entering the same end of the baking chamber near the bottom thereof, thereby providing means at one end of the oven for permitting the continuous loading and unloading of bread on the conveyer by the same operators.

4. An apparatus for baking bread comprising an oven, means for heating the oven, an endless conveyer passing up and down and lengthwise in the oven, said lengthwise portion extending horizontally above the upwardly and downwardly extending portions and traveling in the opposite direction within the oven, whereby the bread must first travel the upwardly and downwardly extending portions and then travel horizontally along the top of the oven, and means at one end of the oven for permitting the bread to be continuously removed from said conveyer near the top of the oven and continuously loaded on the conveyer near the bottom thereof.

In testimony whereof I, the said FREDERICK C. HALLER, have hereunto set my hand.

FREDERICK C. HALLER.

Witnesses:
J. M. GEOGHEGAN,
LOIS WINEMAN.